(12) United States Patent
Atobe et al.

(10) Patent No.: US 6,281,979 B1
(45) Date of Patent: *Aug. 28, 2001

(54) IMAGE RECORDING APPARATUS AND CONTROL METHOD THEREOF

(75) Inventors: Hiroshi Atobe, Kawasaki; Satoshi Nagata, Tama; Yoichi Toyokura; Maiko Suenaga, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,632

(22) Filed: Dec. 8, 1997

(51) Int. Cl.$^7$ ............... B41B 15/00; B41J 15/00
(52) U.S. Cl. ............ 358/1.11; 358/1.16; 358/1.17; 358/296; 358/298; 347/132; 347/129; 347/250
(58) Field of Search ................... 358/296, 298, 358/1.11, 1.16, 1.17; 347/132, 139, 129, 250

(56) References Cited

U.S. PATENT DOCUMENTS

| | | |
|---|---|---|
| 4,528,572 | 7/1985 | Sasaki et al. ............ 346/76 PH |
| 4,578,689 * | 3/1986 | Spencer et al. ............ 347/129 |
| 5,226,112 * | 7/1993 | Mensing et al. ............ 395/114 |
| 5,239,313 * | 8/1993 | Marko et al. ............ 347/132 |
| 5,402,529 * | 3/1995 | Aoki ............ 358/1.11 |
| 5,522,028 | 5/1996 | Nagata et al. ............ 346/76 PH |
| 5,524,198 | 6/1996 | Maisumo ............ 346/76 PH |
| 5,652,660 | 7/1997 | Seto et al. ............ 346/76 PH |
| 5,664,070 * | 9/1997 | Egawa et al. ............ 358/1.2 |

FOREIGN PATENT DOCUMENTS

| | | | |
|---|---|---|---|
| 0386995 | 9/1990 | (EP) . | |
| 0447126A2 * | 7/1991 | (EP) | ............ G06K/15/02 |
| 473017A * | 4/1992 | (EP) . | |
| 60-004069 * | 10/1985 | (JP) . | |
| 61-258765 * | 11/1986 | (JP) . | |
| 04189154 | 7/1992 | (JP) . | |
| 05019988 * | 1/1993 | (JP) . | |
| 05108282 * | 4/1993 | (JP) . | |

* cited by examiner

Primary Examiner—Edward Coles
Assistant Examiner—Twyler Lamb
(74) Attorney, Agent, or Firm—Fitzpatrick, Cella, Harper & Scinto (57) ABSTRACT

A dot pattern is generated by using scalable font data on the basis of received print data, and then printed. One scalable font set corresponds to two kinds of dot pattern generating modes. One generates a dot pattern with quality being given precedence, and the other generates a dot pattern with speed being given precedence and for printing at high speed, though quality inferior. The two modes are switchable to perform printing to fit user's needs.

28 Claims, 7 Drawing Sheets

IMAGE RECORDING APPARATUS AND CONTROL METHOD THEREOF

BACKGROUND OF THE INVENTION

The present invention relates to an image recording apparatus and control method thereof and, more particularly, to an image recording apparatus which records an image based on inputted print data on a recording medium, such as a recording paper sheet, and a control method of the apparatus.

A conventional apparatus of this kind, especially an image processing unit of a laser beam printer, such as a page printer, is constructed so that font data and font scaler, which generate font pattern of desired size on the basis of font data, corresponds to each other on a one-to-one relationship.

In general, the font scaler operates a very complicated process so that image quality is given priority. Therefore, when a page containing many characters is printed, the process requires considerable time, and the user has to wait for a considerably long time until the printing job is completed, although the quality of the printing is high.

SUMMARY OF THE INVENTION

The present invention has been made in consideration of the above situation, and has as its object to provide the image recording apparatus and control method thereof capable of operating process which is suitable to operator environment and needs, by switching processing speed and output quality being given precedence.

Accordingly, it is a purpose of the present invention to provide an image recording apparatus which generates pixel image data on the basis of print data, and which records an image based on the generated pattern on a record medium such as a recording paper sheet, comprising: first pattern generating means for generating pixel image data which is based on print data with quality being given precedence; second pattern generating means for generating pixel image data which is based on print data with speed being given precedence; and selecting means for selecting either one of the first or second pattern generating means.

It is another object of the present invention to provide a method to control the image recording apparatus, which generates pixel image data on the basis of print data, and which records an image based on the generated pattern on a record medium such as a recording paper sheet, comprising: a first pattern generating step of generating pixel image data which is based on print data with quality being given precedence; a second pattern generating step of generating pixel image data which is based on print data with speed being given precedence; and a selecting step of selecting either one of the first or second pattern generating steps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain he principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
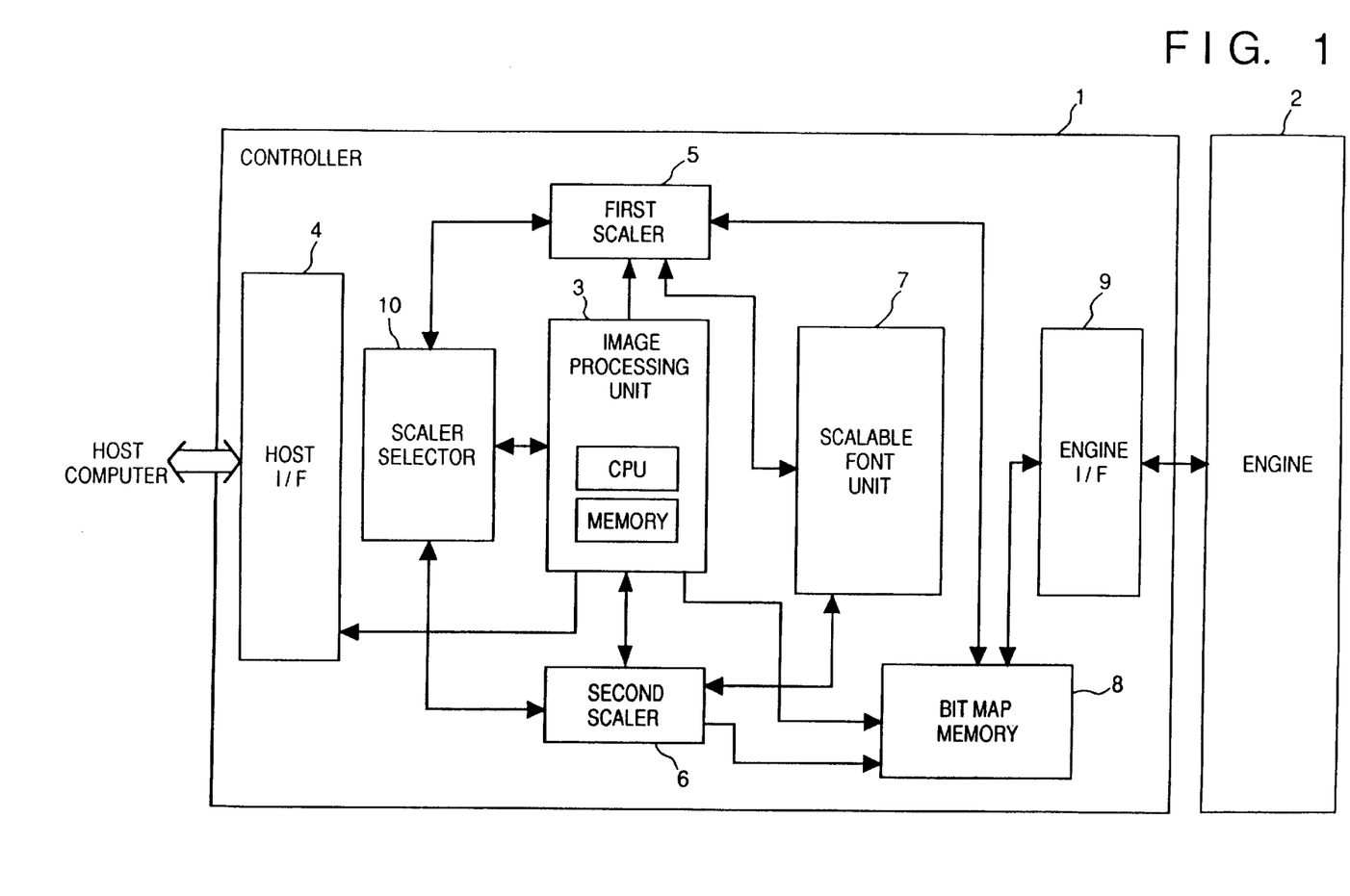
FIG. 1 is a block diagram of a printer according to a first embodiment.

FIG. 1 is a block diagram of a laser beam printer according to the first embodiment.

In this figure, reference numeral 1 denotes a controller which controls an entire apparatus, reference numeral 2 denotes an engine for printing an image on a printing paper sheet. The controller 1 contains a plurality of units which are described below.

Figure 2:
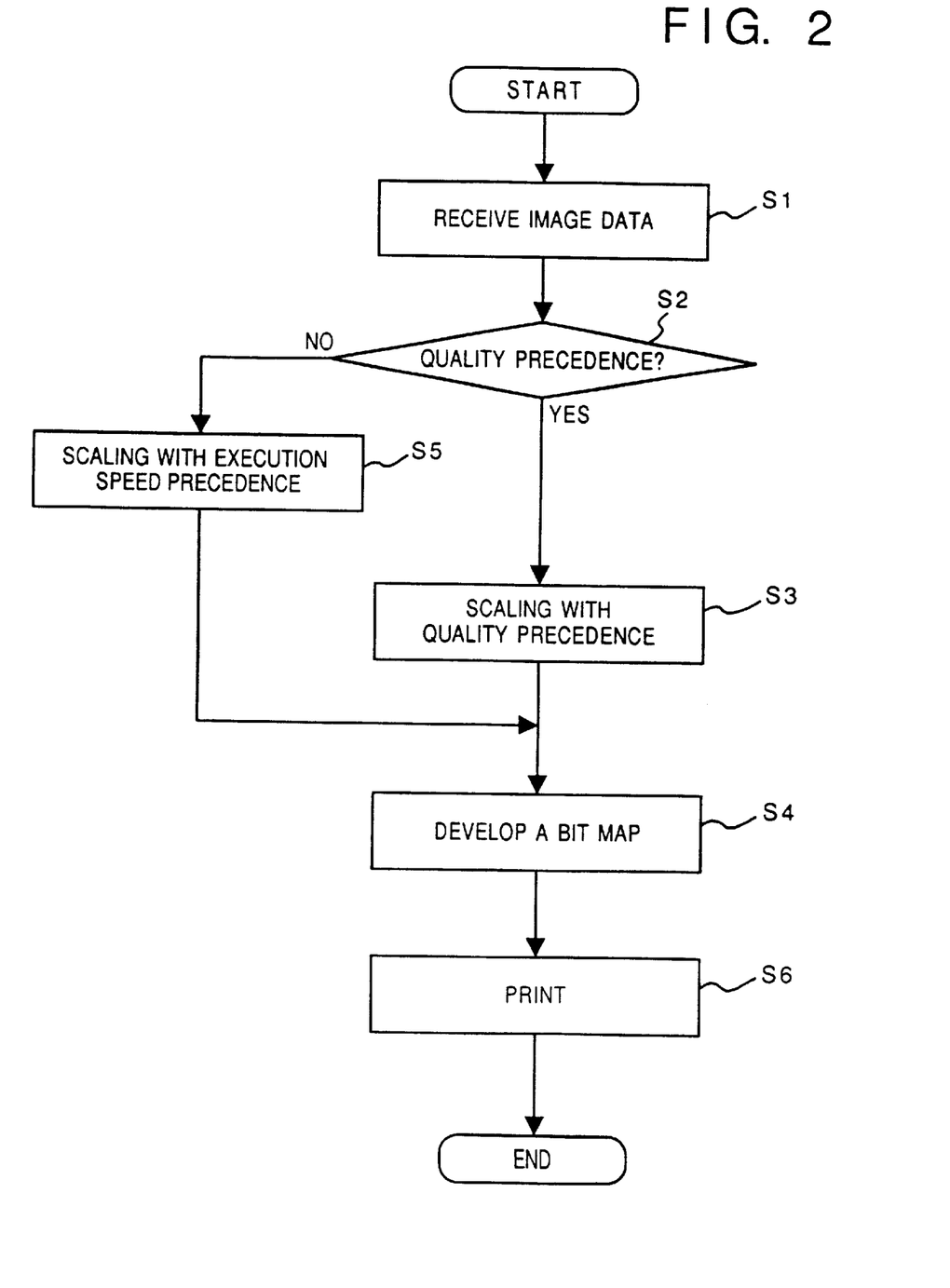
FIG. 2 is a flowchart showing the operation in the first embodiment.

Reference numeral 3 denotes an image processing unit which controls respective units in order to process an image based on received print data and which comprises CPU and memories for storing operation sequence of the CPU (a sequence (program) shown in FIG. 2); 4, a host I/F for communicating with a host computer which generates the print data; 5, a first scaler which scales scalable font with printing quality being given precedence; 6, a second scaler which scales scalable font with printing speed being given precedence; 7, a scalable font unit which stores font data capable of compressing and enlarging character, and which stores outline font data in the first embodiment; 8, a bit map memory capable of storing a page of a bit map image for printing; 9, an engine I/F for communicating with the engine 2; 10, a scaler selector which selects either one of the first scaler 5 or the second scaler 6 under control by the image processing unit 3. Further, the apparatus comprises a control panel for inputting instructions by an operator and for displaying various kinds of massages, though it is not shown in the figure.

Figure 7:
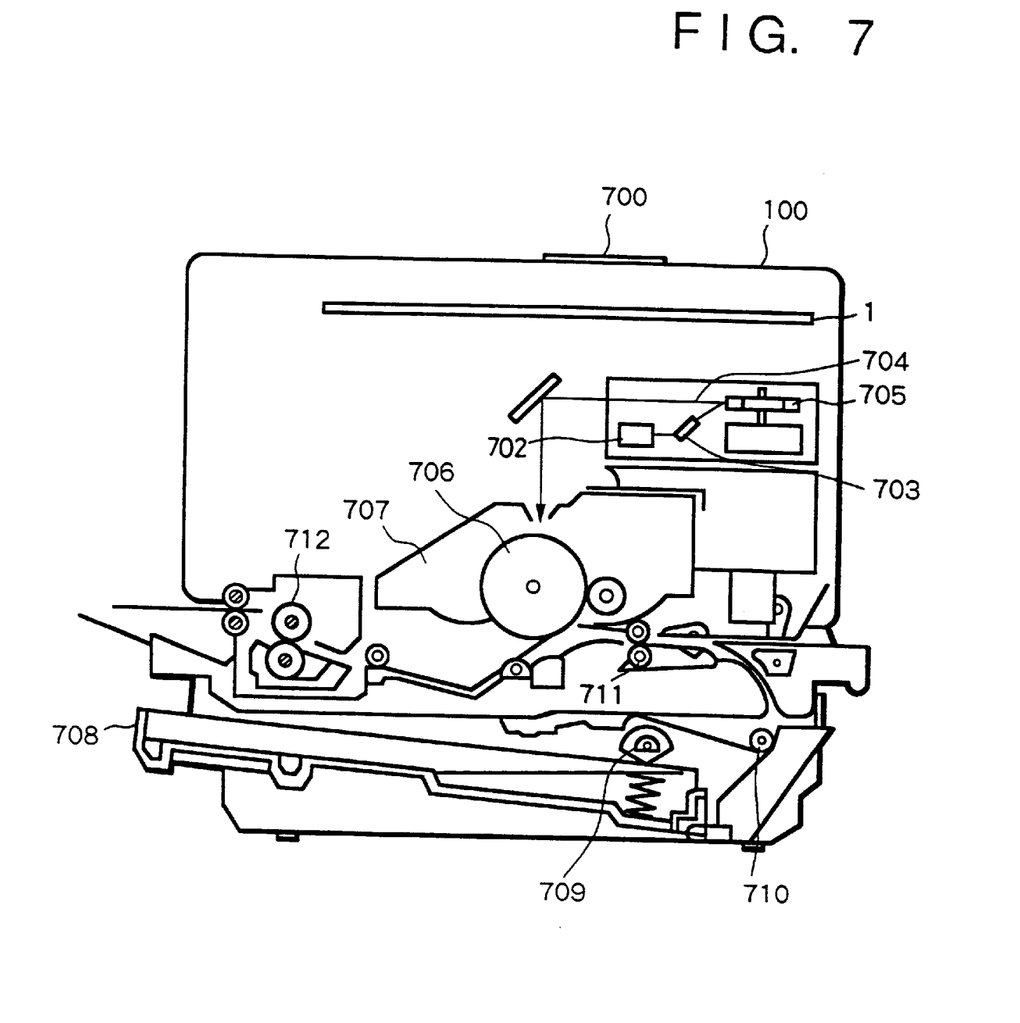
FIG. 7 is a cross sectional view of a laser beam printer suitable to embodiments.

The structure of the laser beam printer in the first embodiment is shown in FIG. 7.

In FIG. 7, a LBP main body 100 inputs and stores print information (e.g. character code), form information, and macro instruction provided from the host computer which is externally connected, as well as generates patterns, such as a character pattern and a form pattern, based on the inputted information, and forms an image on a record medium, such as a printing paper sheet. Reference numeral 700 denotes a control panel having switches for operation, a LCD display, and so on. A controller 1 is on a print subtrate as shown in FIG. 7, and a signal (a video signal) sent from the controller 2 is outputted to a laser driver 702 via the printer engine I/F 9.

The laser driver 702 is for driving a semiconductor laser 703, and switches a laser beam 704, which is irradiated from the semiconductor laser 703, on and off in dependence upon the inputted video signal. A rotating polygon mirror 705 sweeps the laser beam 704 from right to left, thus the laser beam 704 exposes an electrostatic drum 706. Thereby an electrostatic latent image corresponding to a character pattern and an image is formed on the electrostatic drum 706. After the latent image is developed by a developer 707 which is placed next to the electrostatic drum 706, the developed image is transferred on printing paper. A cut sheet is used as the printing paper, and the printing paper sheet is stored in a paper feed tray 708 attached to a LBP 100, and fed to the inside of the printer by a paper feed roller 709 and conveying rollers 710 and 711, then provided to the electrostatic drum 706.

When the recording paper sheet is conveyed to the electrostatic drum 706, the developed image (a toner image) on the drum 706 is transferred on the recording paper sheet. Afterwards, a fixing unit 712, which has been heated, fixes the toner on the printing paper sheet, and then it is discharged outside.

The operation of the controller 1 having the aforesaid structure is described below with reference to FIG. 2.

At step S1, the host I/F 4 provided in the controller 1 receives the print data from the host computer (not shown). The print data contains a text information as well as information on the font to be used. At step S2, the image processing unit 3 determines which kind of process is to be performed, quality precedence with slow processing or speed precedence with inferior quality. The determination by the image processing unit 3 can be made based on a command included in the print data from the host computer, on designated resolution for the image data, or on an operation from the operation panel 700 which is operated by a user.

If the quality precedence process is selected at step S2, the scaler selector 10 selects the first scaler 5 to perform scaling with quality precedence which puts emphasis on smoothness of outline at step S3.

The scaled font (pattern data outputted from the first scaler 5) is developed into a bit map by the image processing unit 3 at step S4, and stored in the bit map memory 8.

Whereas, if the speed precedence process is selected at step S2, the scaler selector 10 selects the second scaler 6 to perform scaling giving execution speed precedence over smoothness of outline at step S5. The scaled font from the second scaler 6 is also developed into a bit map by the image processing unit 3 at step S4, then stored in the bit map memory 8.

When developing a bit image to the bit map memory 8 for one page is completed, the image processing unit 3 transmits the bit image in the bit map memory 8 to the engine 2 via the engine I/F 9 at step S6. Both the first scaler 5 and the second scaler 6 commonly utilizes font data format specified by the unique scalable font unit 7, therefore it is possible to select either one of these scalers independent of the kinds of image data and kinds of font.

Further, numbers of the scalers and font used in the first embodiment are two and one (two kinds of scalers correspond to one kind of font data), respectively, however, there is no limitation to the numbers of the scalers and fonts possible, and relationships such as 3:1, 4:1, 3:2, and 4:3 (number of scalers used: number of fonts) are allowed. In other words, font data which is used by a plurality of font scalers, can be more than two kinds, and execution speed and quality can be set in a plurality of degrees.

Examples of uses of the first scaler 5 and the second scaler 6 are described below.

In order to simplify the explanation, assume that the font data which is managed by the scalable font data unit 7 in the embodiment includes coordinate data of points which makes an outline of a font pattern. When the outline is formed, a predetermined number of the coordinate data are read, and an approximation curve which passes through those points is determined. This process is repeated until the outline of a character is formed. After the outline is formed, inside of the outline is filled with "1", thereby a character pattern for printing is generated.

Here, the first scaler 5 forms the outline by generating the aforesaid approximation curves (spline curves, for instance), and the second scaler 6 connects coordinate points using straight lines.

Therefore, in a case where the second scaler 6 is selected, the outline of the font pattern can be formed in a very short time, since complicated operations, such as spline curve fitting, do not have to be performed.

On the other hand, since the first scaler 5 forms the outline of a character by using the approximation curves, smoother outline than the one formed by the second scaler 6 is formed, thus it is possible to keep the printing quality high although the printing speed is slow.

Further, changeover between the first scaler 5 and the second scaler 6 is performed in accordance with a command from the upper apparatus, such as a host computer, or by an operation from the control panel provided on a laser beam printer.

However, the user need not know of the existence of the first scaler 5 and the second scaler 6, and select one of them.

Generally, for a laser printer, the resolutions can be changed by changing a clock frequency for transmitting a video signal from the engine I/F 9 to the engine 2 (clock frequency of the driving signal of a semiconductor laser 703), and the rotation speed of the electrostatic drum 706 and the rotating polygon mirror 705.

A reason why the user sets high resolution printing is that the user wants to print in high quality. Thus, for a printing apparatus capable of changing resolutions, if the resolution is selected as high, then the first scaler 5 is selected, whereas in a case where the low resolution is selected, then the second scaler 6 is selected.

Further, if distances between the coordinate points, which are indicated in the coordinate data included in the font data, are short, it is possible to change the distances between the coordinate points which are referred when the approximation line is formed. For example, assume that there are one-hundred coordinate points for a character (points P1, P2, . . . , P100), all the points are used to form the approximation curve for high resolution. For medium resolution, a reduced number of points, P1, P3, P5, . . . , for example, are selected in order to reduce a number of times to perform operations, and used to form the approximation curve. Further points are reduced for low resolution, and the points, such as P1, P4, P7, . . . are used to form the approximation curve. Likewise, the operation speed becomes faster as more coordinate points are reduced for fitting to a curve.

Note that, in the above-described embodiment, spline curve is used to form an outline, however, the known Bézier's curve is also commonly used. Usually, to fit to the Bézier's curve, there are required four points which decide the ends of the curve, Q1 and Q2, and decide the direction and swell of the curvature, R1 and R2.

Thus, it requires a plurality sets of Bézier's data each of which is composed of four points to form an outline of a character. In other words, when a Bézier's curve is used to form a character pattern, one font data need to have a plurality sets of Bézier's curve data.

Assume that there are two Bézier's curves, A and B which are to be connected. In this case, the first scaler 5 makes an image of those two Bézier's curves individually. Whereas the second scaler 6 makes one Bézier's curve by using the two end points assuming a case where the two Bézier's curves have been already connected, and using two points out of six points, which are placed between ends, to decide the direction and the swell of the curvature. In this way, the operation time to make the Bézier's curve is halved, thereby the outline of the character can be formed in a shorter time.

This method may require more time compared to the aforesaid process where the second scaler 6 connects the coordinate points with straight lines, however, the quality is better.

In the first example, the first scaler 5 and the second scaler 6 use different algorithms, however, it is possible for the both scalers to use the same algorithm. In short, the first scaler 5 performs a double precision operation, whereas the second scaler 6 performs a single precision operation. Therefore, the operation speed by the second scaler 6 is faster than the one by the first scaler 5, however, the quality processed by the second scaler 6 is worse than the one by the first scaler 5.

[Second Embodiment]

The second embodiment is explained below in detail with reference to figures.

Figure 3:
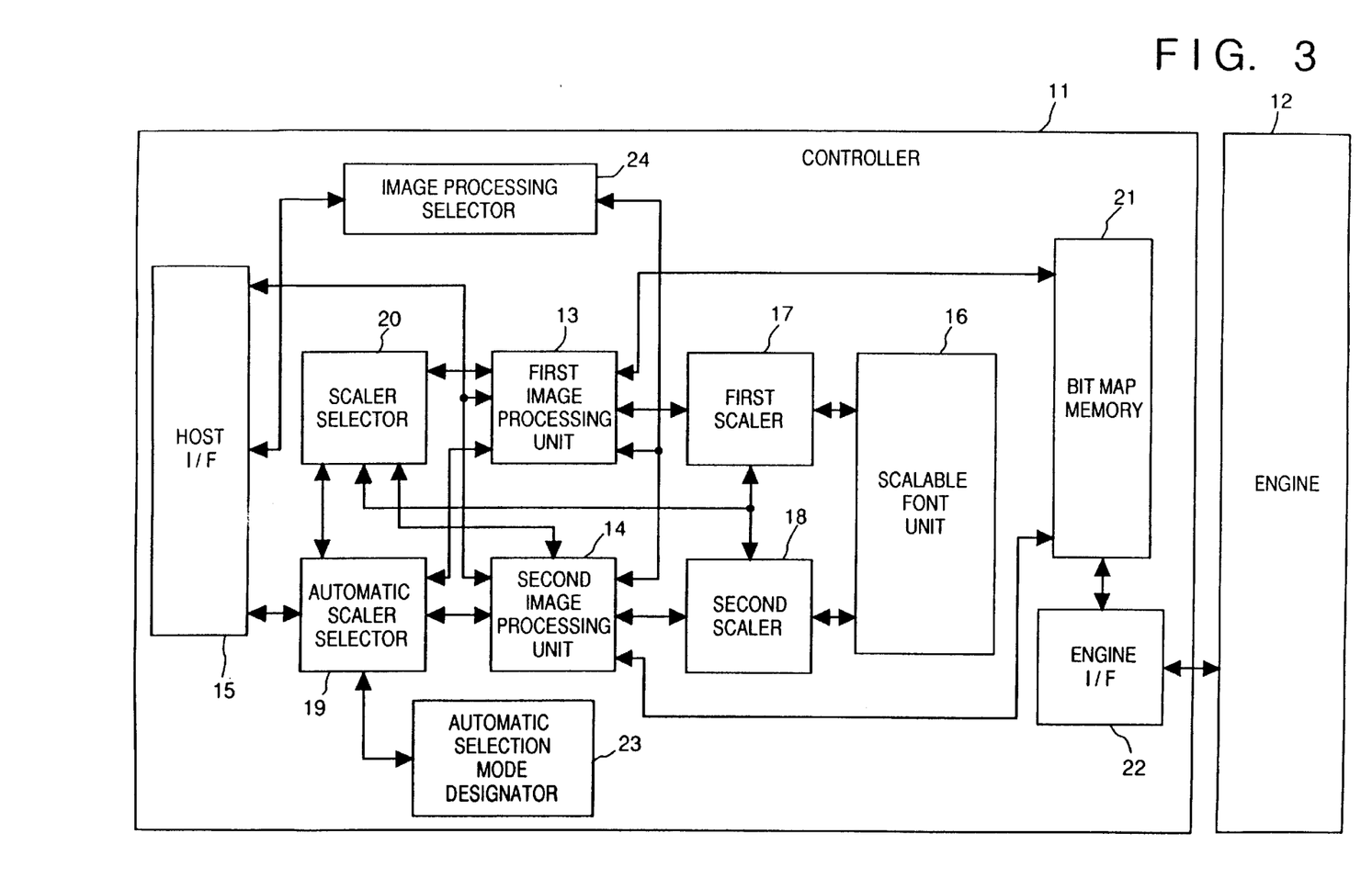
FIG. 3 is a block diagram of a printer according to a second embodiment.

FIG. 3 is a block diagram of a laser beam printer according to the second embodiment.

Reference numeral 11 denotes a controller capable of developing an image forming at resolution of 300 dpi or 600 dpi; 12, an engine capable of printing an image on a printing paper sheet at resolution of 300 dpi or 600 dpi; 13, a first image processing unit which processes transmitting data in a first data format (a first page description language) from the host computer; 14, a second image processing unit which processes transmitting data in a second data format (a second page description language) from the host computer; 15, a host I/F for communicating with the host computer; 16, a scalable font unit for holding font data capable of being compressed and enlarged; 17, a first scaler for scaling font from the scalable font unit 16 with quality being given precedence; 18, a second scaler for scaling font from the scalable font unit 16 with execution speed being given precedence; 19, an automatic scaler selector which automatically selects one of the scalers on the fixed determination basis when an automatic selection mode is set; 20, a scaler selector which designates the scaler to be used out of the first scaler 17 and the second scaler 18; 21, a bit map memory for storing an bit map image; 22, an engine I/F for communicating with the engine 12; 23, an automatic selection mode designator which sets up whether or not the scaler is automatically selected; 24, an image processing selector which selects the processing unit to be used out of the first image processing unit 13 and the second image processing unit 14.

Note that the printer engine 12 is basically the same as the one described in the first embodiment with reference to FIG. 7, however, it has two kinds of recording resolution and a transfer clock from the engine I/F 22 to the laser driver 702 is changed in dependence upon the kind of resolution, and so as the rotating speed of the rotating polygon mirror 705, the rotating speed of the electrostatic drum 711, the conveying speed of a recording paper sheet during transference, and so on.

Figure 4:
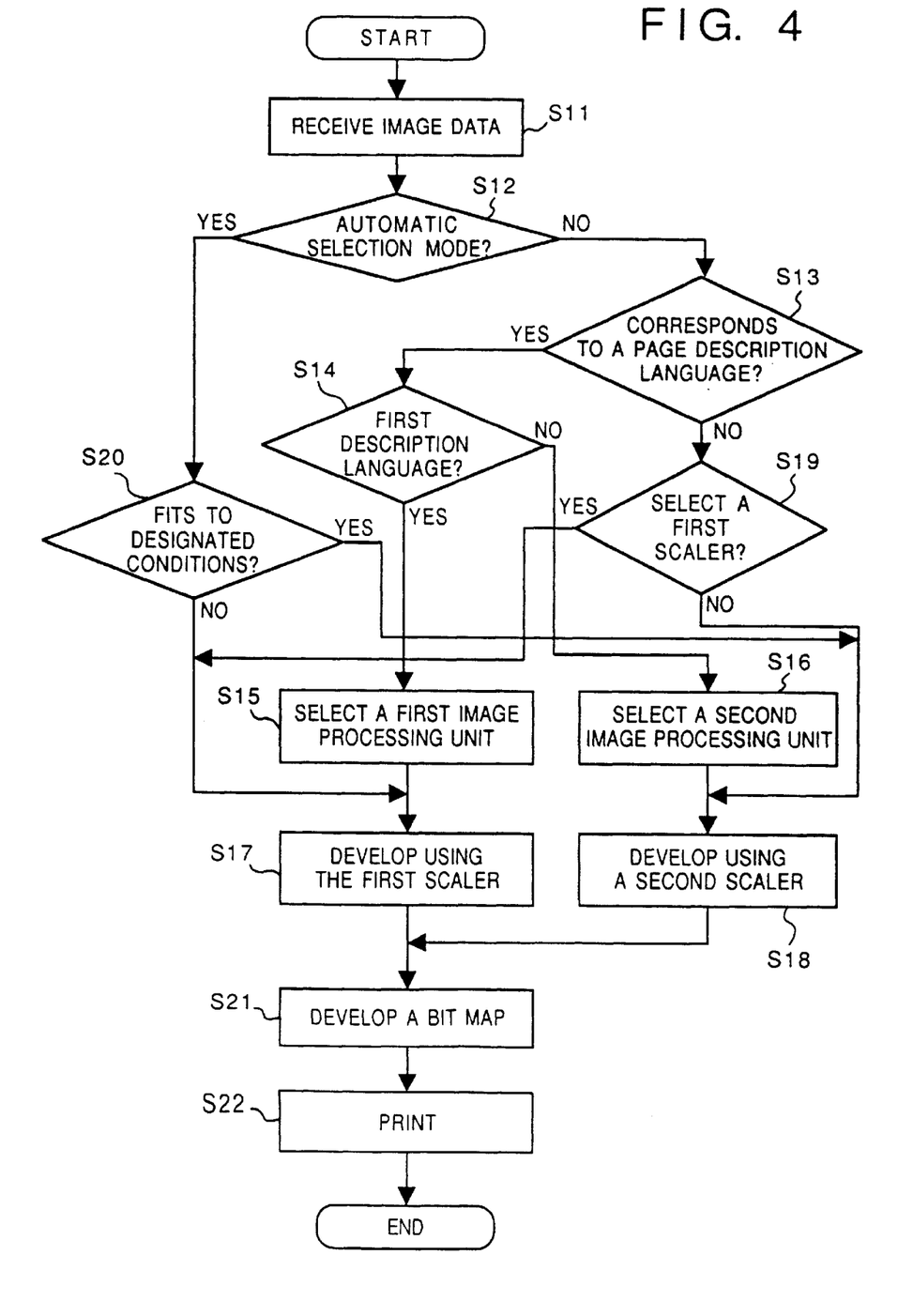
FIG. 4 is a flowchart showing the operation in the second embodiment.

FIG. 4 is a flowchart explaining the operation according to the second embodiment.

At step S11, the host I/F 15 in the controller 11 receives image data from the host computer (not shown). The automatic scaler selector 19 discriminates whether or not a mode for automatically selecting a scaler is set by the automatic selection mode designator 23 at step S12. The mode which is set by the automatic selection mode designator in this embodiment can be set in accordance with a command or the like from the control panel 700 and the host computer. The modes set by the automatic selection mode designator can be following two kinds, for instance.

(1) Automatic selection mode (Yes, at step S12)

(2) Intentional selection mode (No, at step S12)

In the manual selection mode referred as (2) above, the image processing selector 24 can be set so as to select one scaler according to the related image processing unit 13 or 14. For example, the first scaler 17 is selected for an image processed by the first image processing unit 13 (an image written in the first page description language), and the second scaler 18 is selected for an image processed by the second image processing unit 14 (an image written in the second page description language). As described above, at step S13, whether or not a set-up, in which the scaler is selected in accordance with the page description language, is designated in the intentional selection mode. When the scalers and the languages relate each other, image data received by the host I/F 15 is determined whether they are written in the first page description language or in the second page description language by the image processing selector 24.

The image processing selector 24 determines the received page description language by using a method such as pattern matching to the header of each page description language at step S14. Based on the determination like this, the image process unit 24 selects the first image processing unit 13 in a case where the first page description language is determined (step S15), and develops scalable font by using the first scaler 17 (step S17). Whereas the second image processing unit 14 is selected in a case where the second page description language is determined (step S16), and develops scalable font by using the second scaler 14 (step S18).

If the scalers are independent of the page description languages at step S13, then the scaler can be selected directly by the scaler selector 20 at step S19. This allows to intentionally designate the forbidden scaler. In other words, the first scaler can be always selected whereas the second scaler is forbidden, for example. The intentional selection by the scaler selector 20 can be performed in accordance with a command or the like from the control panel 700 and the host computer, for example. If the intentional selection by the scaler selector 20 designates the first scaler, the first scaler is used for developing the scalable font at step S17. On the contrary, if the intentional selection designates the second scaler, the second scaler is used for developing the scalable font unit 16 at step S18. At the time of the intentional selection at step S19, the selection of the image processing unit (the first or the second image processing unit) does not depend on the selection of the scaler but depends on the selection by the image processing selector 24.

The selection of the image processing unit by the image processing selector 24 can be made depending on a kind of received data, a set-up from the operation panel, and a command from the host computer.

If the automatic selection mode is set up by the automatic selection mode designator 23 at step S12, the automatic scaler selector 19 automatically selects the scaler based on whether or not the scaler fits predetermined conditions described hereafter at step S20.

In the second embodiment, the first scaler 17 gives quality precedence which includes HINT information, and the second scaler 18 gives execution speed precedence.

The conditions under which the second scaler is to be selected are:

(1) Image developing resolution is designated as 300 dpi (or in a draft mode);

(2) A number of pages designated to be printed in one job from the host computer exceeds a predetermined number of pages;

(3) A number of fonts used in one job from the host computer exceeds a predetermined number of fonts;

(4) An amount of transmitting data (data amount/one page) from the host computer exceeds the predetermined amount of data.

When at least one of the aforesaid conditions is "true", the automatic scaler selector 19 determines that the development requires speed precedence, then designates that the second scaler is selected to the scaler selector 20. It should be noted that the four designation conditions are indicated above in the second embodiment, however, conditions are not limited to these four. The scaler selector 20 selects the first scaler at step S17 or the second scaler at step S18 in accordance with the selection by the automatic scaler selector 19 to develop the scalable font.

When the automatic scaler selection mode is set at step S12, the selection of the image processing unit (either the first image processing unit or the second image processing unit) is decided based not on the selection of the scaler but on the selection by the image processing selector 24.

The font data developed at step S17 or S18 are stored in the bit map memory 21 as bit map data of an image to be printed by the first or the second image processing unit at step S21.

The bit map data stored in the bit map memory 21 is transmitted to the engine I/F 22, then printed by the engine 12 at step S22. Since both of the first scaler 17 and the second scaler 18 utilizes the data format of the unique scalable font unit 16, it is possible to select either one of the scalers without depending on image data and a kind of font.

In this embodiment, a case where number of the scalers and fonts are 2 and 1, respectively, is employed for the explanation, however the number of the scalers and fonts are not limited to the one in the present embodiment.

[Third Embodiment]

The third embodiment is explained in detail with reference to figures.

Figure 5:
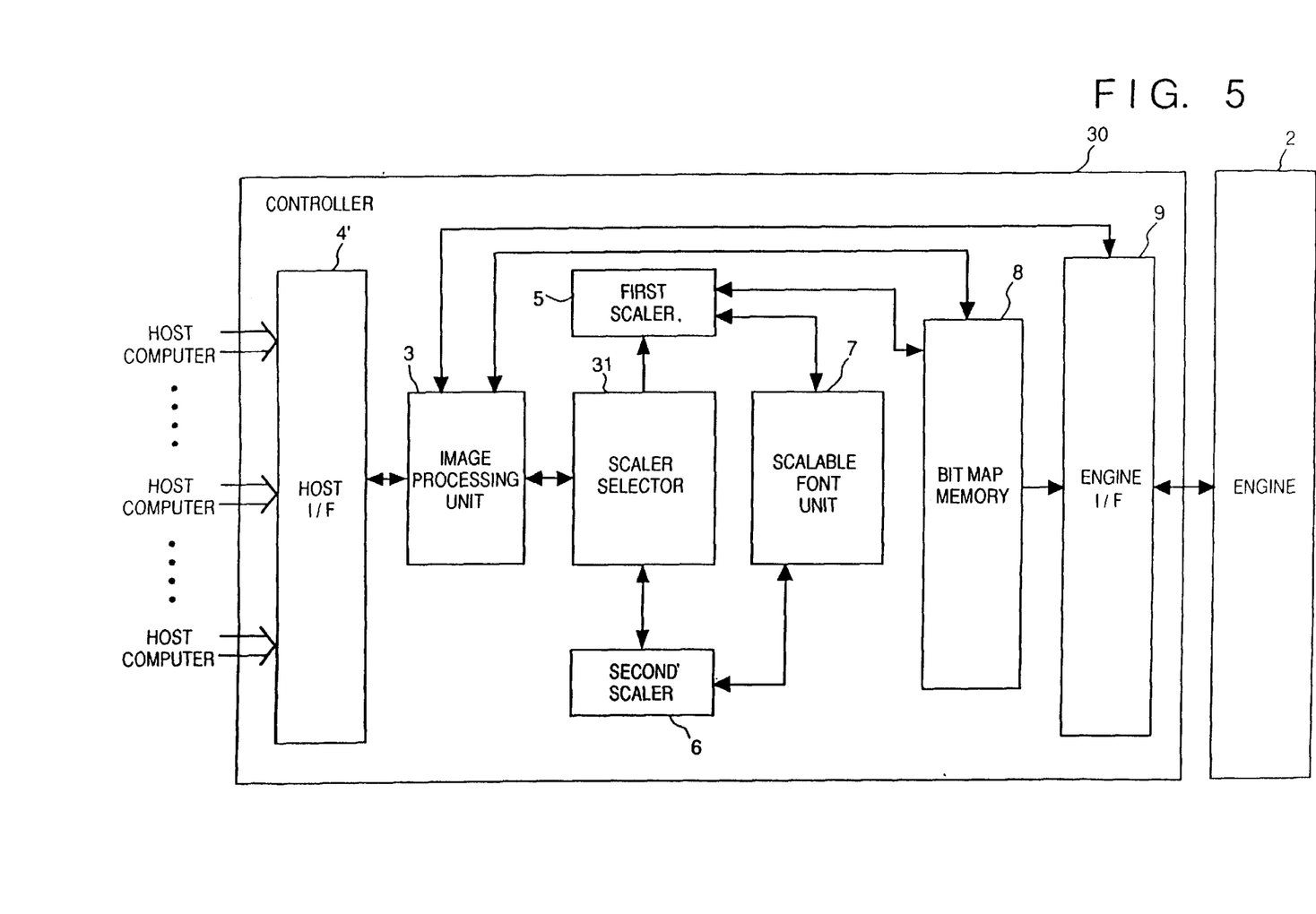
FIG. 5 is a block diagram of a printer according to a third embodiment.

FIG. 5 is a block diagram of a laser beam printer in the third embodiment. In this figure, reference numeral 30 denotes a control unit which corresponds to the reference numeral 1 in the first embodiment explained above. Units which have the same function as the units explained in the first embodiment have the same reference numeral as in the first embodiment, and explanations on those units are omitted.

In FIG. 5, the host I/F 4' comprises a plurality of interfaces. The scaler selector 31 selects either the first scaler 5 or the second scaler 6 in dependence upon through which host I/F an image data from the host computer is received.

Type of interfaces applicable to the present invention are an interface by Centronics Co., Ltd. in the United States (known as Centro), RS232C interface, and so on.

Figure 6:
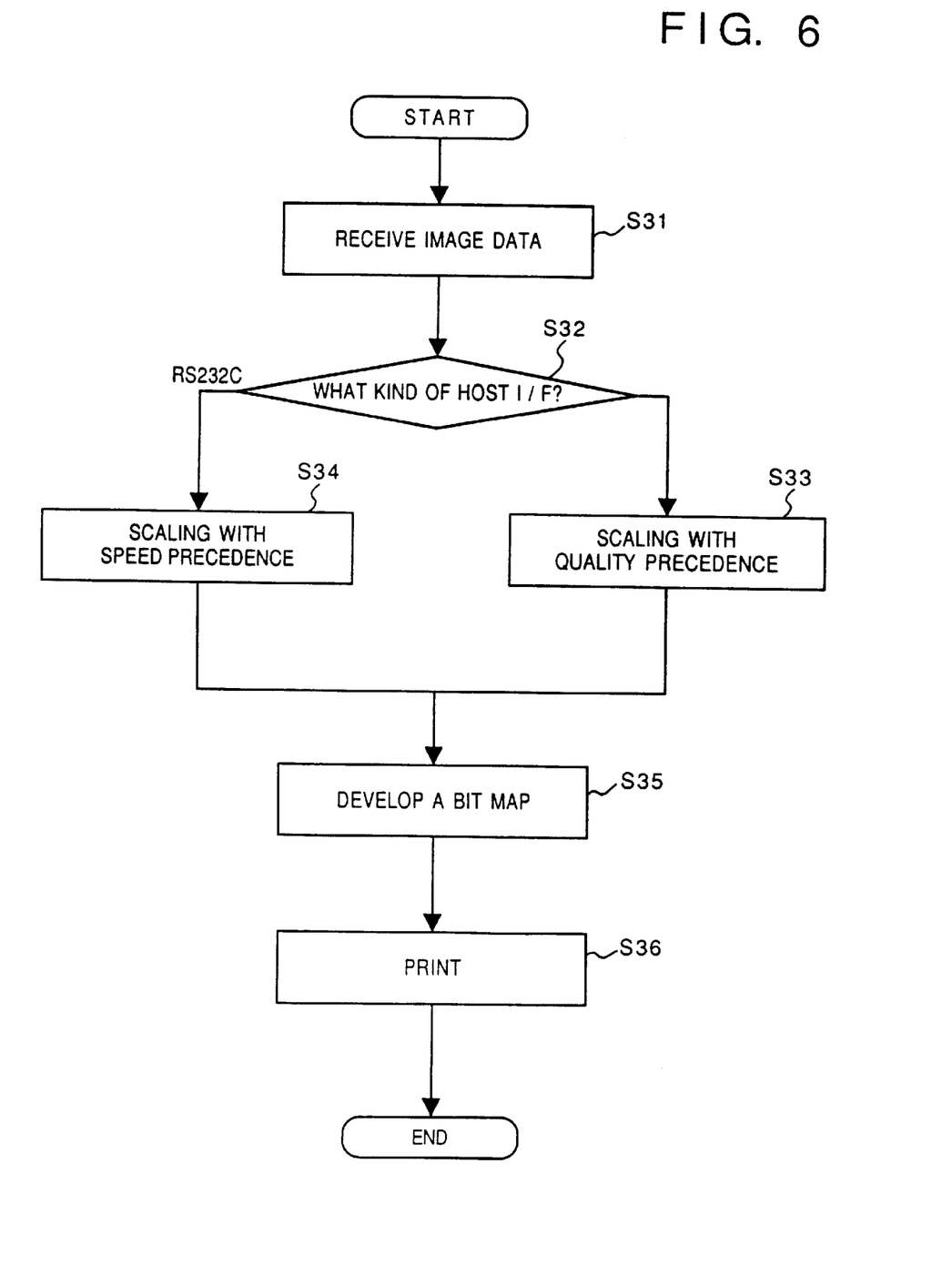
FIG. 6 is a flowchart showing the operation in the third embodiment.

FIG. 6 is a flowchart according to the third embodiment. The third embodiment is explained with reference to the flowchart in the figure.

A host I/F 4 which is inside of the controller 30 receives image data from the host computer (not shown) at step S31. At S32, the image processing unit 3 discriminates through which host I/F the image data is transmitted, then provides information on the discrimination to the scaler selector 31. In a case where the data is sent through the Centronics interface, the scaler selector 31 selects the first scaler 5 which gives quality precedence at step S33, whereas in a case where the data is transmitted through RS233C interface, the scaler selector 31 selects the second scaler 6 which gives speed precedence at step S34.

One of the reasons for performing this kind of selection is that data transmission through RS232C requires much longer time than through the Centronics interface, in general.

Another reason is that grouping of the host computer, an application software, a print driver, user, and so on can be made in dependence upon the type of the host I/F in a certain degree.

A font scaled at step S33 or at step S34 is developed to a bit map by the image processing unit 3, and stored in the bit map memory 8 at step S35.

Then the bit map data stored in the bit map memory 8 is transmitted to the engine I/F 9, and printed by the engine 2 at step S36.

According to the present embodiment as explained above, speed and quality are properly balanced corresponding to the development of font data.

It should be noted that the third embodiment is described by corresponding to the scalable font, however, since a pixel command, such as a line and a circle, is included in a page description language, an apparatus which has two processing units (for speed precedence and quality precedence) which work with different algorithms for performing drawings, or has other processing unit which operates the intermediate operation beside the two processing units (i.e., three processing units altogether) can be applied.

Further, a laser beam printer is employed for explanation of the embodiment, however any printer which develops print data (bit map data) on the basis of the print data can be applied to any kinds of printing method. Therefore, the present invention is not limited to a laser beam printer.

Furthermore, there exists different kinds of fonts beyond count. For example, a font of alphabet is designed by using small number of curve, and a font of Japanese character is designed with a large number of curve. For the former, "approximation curves", "many reference points for calculating the approximation curves", and "double resolution operation" are not necessary, and the process is given speed precedence. In contrast, for the latter, "approximation curves", "many reference points for calculating the approximation curves", and "double resolution operation" are utilized for obtaining high resolution. Further, a scaler which corresponds to a font can be selected by a user from the control panel on the image recording apparatus, or can be contained in a print instruction. In order to retain the inforation set from the control panel, the infomation can be stored in a backed up memory (e.g. EEPROM).

Further, a scaler can be selected in accordance with a language, such as English and Japanese. When Japanese is printed, a scaler can be selected in correspondence with font design such as "Mincho style" and "Gothic style". Note that numbers of the scalers and font used in the third embodiment are two and one (two kinds of scalers correspond to one kind of font data), respectively, however, there is no limitation to the numbers of scalers and fonts possible, and relationships such as 3:1, 4:1, 3:2, and 4:3 (number of scalers used: number of fonts) are allowed. In other words, font data which is used by a plurality of font scalers, can be more than two kinds, and execution speed and quality can be set in a plurality of degrees.

According to the present invention as explained above, a processing suitable to operator environment or request can be performed by giving either processing speed or quality precedence to one scalable font.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. A character processing apparatus comprising:
   a first character pattern generator for generating a character pattern on the basis of scalable font data;
   a second character pattern generator for generating a character pattern faster than said first character pattern generator generates a character pattern, on the basis of scalable font data; and
   a controller for activating said first character pattern generator in a case where information provided to said controller is of a first type of print data, and activating said second character pattern generator in a case where information provided to said controller is of a second type of print data,
   wherein the second type of print data is determined by one of whether the print data exceeds a predetermined number of pages of print information, whether the print data requires a number of fonts exceeding a predetermined number of fonts, and whether the amount of print data on a page exceeds a predetermined amount of print information.

2. The apparatus according to claim 1, further comprising a language processing determiner for inputting print data and for determining whether or not the inputted print data should be processed in a first language,
   wherein said controller activates said first character pattern generator if said language processing determiner determines that the inputted print data should be processed in the first language, and wherein said controller activates said second character pattern generator means if said language processing determiner determines that the inputted print data should not be processed in the first language.

3. The apparatus according to claim 1, wherein each type of print data includes a page description language.

4. The apparatus according to claim 1, further comprising a printer for printing a character pattern generated by either said first character pattern generator or said second character pattern generator.

5. The apparatus according to claim 1, wherein said first character pattern generator generates a character pattern with quality being given precedence, and said second character pattern generator generates a character pattern with speed being given precedence.

6. The apparatus according to claim 1, wherein said first and second character pattern generators generate a character pattern using common scalable font data.

7. The apparatus according to claim 1, wherein the scalable font includes an outline font.

8. A character processing method, comprising the steps of:
   providing a first character pattern generator for generating a character pattern on the basis of scalable font data;
   providing a second character pattern generator for generating a character pattern faster than the first character pattern generator generates a character pattern, on the basis of scalable font data; and
   activating the first character pattern generator in a case where provided information is of a first type of print data, and activating the second character pattern generator in a case where provided information is of a second type of print data,
   wherein the second type of print data is determined by one of whether the print data exceeds a predetermined number of pages of print information, whether the print data requires a number of fonts exceeding a predetermined number of fonts, and whether the amount of print data on a page exceeds a predetermined amount of print information.

9. The method according to claim 8, further comprising the steps of:
   inputting print data;
   determining whether or not the inputted print data should be processed in a first language; and
   wherein the first character pattern generator is activated if it is determined that the inputted print data should be processed in the first language, and wherein the second character pattern generator is activated if it is determined that the inputted print data should not be processed in the first language.

10. The method according to claim 8, wherein each type of print data includes a page description language.

11. The method according to claim 8, further comprising a step of printing a character pattern generated by either the first character pattern generator or the second character pattern generator.

12. The method according to claim 8, wherein the first character pattern generator generates a character pattern with quality being given precedence, and the second character pattern generator generates a character pattern with speed being given precedence.

13. The method according to claim 8, wherein the first and second character pattern generators generate a character pattern using common scalable font data.

14. The method according to claim 8, wherein the scalable font includes an outline font.

15. A computer-readable storage medium storing a program for performing a character processing method, the program comprising:
   first code for activating a first character pattern generator to cause the first character pattern generator to generate a character pattern on the basis of scalable font data;
   second code for activating a second character pattern generator to cause the second character pattern generator to generate a character pattern faster than the first character pattern generator generates a character pattern, on the basis of scalable font data; and
   code for causing the first code to activate the first character pattern generator in a case where provided information is of a first type of print data, and for causing the second code to activate the second character pattern generator in a case where provided information is of a second type of print data, wherein the second type of print data is determined by one of whether the print data exceeds a predetermined number of pages of print information, whether the print data requires a number of fonts exceeding a predetermined number of fonts, and whether the amount of print data on a page exceeds a predetermined amount of print information.

16. The storage medium according to claim 15, wherein the program further comprises:

code for inputting print data; and code for determining whether or not the inputted print data should be processed in a first language;

wherein the first code activates the first character pattern generator if it is determined that the inputted print data should be processed in the first language, and wherein the second code activates the second character pattern generator if it is determined that the inputted print data should not be processed in the first language.

17. The storage medium according to claim 15, wherein each type of print data includes a page description language.

18. The storage medium according to claim 15, further comprising code for causing a character pattern generated by either the first character pattern generator or the second character pattern generator to be printed.

19. The storage medium according to claim 15, wherein the first character pattern generator generates a character pattern with quality being given precedence, and the second character pattern generator generates a character pattern with speed being given precedence.

20. The storage medium according to claim 15, wherein the first and second character pattern generators generate a character pattern using common scalable font data.

21. The storage medium according to claim 15, wherein the scalable font includes an outline font.

22. A program product for executing a character processing method, the program product comprising:

first code for activating a first character pattern generator to cause the first character pattern generator to generate a character pattern on the basis of scalable font data;

second code for activating a second character pattern generator to cause the second character pattern generator to generate a character pattern faster than the first character pattern generator generates a character pattern, on the basis of scalable font data; and code for causing the first code to activate the first character pattern generator in a case where provided information is of a first type of print data, and for causing the second code to activate the second character pattern generator in a case where provided information is of a second type of print data, wherein the second type of print data is determined by one of whether the print data exceeds a predetermined number of pages of print information, whether the print data requires a number of fonts exceeding a predetermined number of fonts, and whether the amount of print data on a page exceeds a predetermined amount of print information.

23. The program product according to claim 22, further comprising:

code for inputting print data; and code for determining whether or not the inputted print data should be processed in a first language;

wherein the first code activates the first character pattern generator if it is determined that the inputted print data should be processed in the first language, and wherein the second code activates the second character pattern generator if it is determined that the inputted print data should not be processed in the first language.

24. The program product according to claim 22, wherein each type of print data includes a page description language.

25. The program product according to claim 22, further comprising code for causing a character pattern generated by either the first character pattern generator or the second character pattern generator to be printed.

26. The program product according to claim 22, wherein the first character pattern generator generates a character pattern with quality being given precedence, and the second character pattern generator generates a character pattern with speed being given precedence.

27. The program product according to claim 22, wherein the first and second character pattern generators generate a character pattern using common scalable font data.

28. The program product according to claim 22, wherein the scalable font includes an outline font.

* * * * *

UNITED STATES PATENT AND TRADEMARK OFFICE
CERTIFICATE OF CORRECTION

PATENT NO.   : 6,281,979 B1
DATED        : August 28, 2001
INVENTOR(S)  : Hiroshi Atobe et al.

It is certified that error appears in the above-identified patent and that said Letters Patent is hereby corrected as shown below:

Title page,
Item [30], insert -- [30]   Foreign Application Priority Data
Oct. 21, 1993   (JP) ..........................5-263306
Oct. 4, 1994    (JP) ..........................6-240020 --; and
Item [56], References Cited, under U.S. PATENT DOCUMENTS:
"Maisumo" should read -- Maisumo et al. --; and
Under FOREIGN PATENT DOCUMENTS:
"0447126A2" should read -- 0447126 --;
"04189154" should read -- 4-189154 --;
"05019988" should read -- 5-019988 --; and
"05108282" should read -- 5-108282 --.

Column 1,
Line 62, "he" should read -- the --.

Column 2,
Line 44, "massages," should read -- messages, --.

Column 4,
Line 66, "need" should read -- need is --.

Column 6,
Line 25, "relate" should read -- relate to --;
Line 43, "allows to" should read -- allows --;
Line 44, "designate" should read -- designating --; and
Line 45, "be always" should read -- always be --.

Column 7,
Line 15, "fonts;" should read -- fonts; and --;
Line 45, "where" should read -- where a --; and
Line 65, "Type" should read -- Types --.

Column 8,
Line 39, "other" should read -- another --;
Line 45, "kinds" should read -- kind --;
Line 49, "small number of curve," should read -- a small number of curves, --;
Line 50, "curve." should read -- curves. --;
Line 61, "inforation" should read -- information --; and
Line 62, "(e.g." should read -- (e.g., --.

UNITED STATES PATENT AND TRADEMARK OFFICE
CERTIFICATE OF CORRECTION

PATENT NO. : 6,281,979 B1
DATED : August 28, 2001
INVENTOR(S) : Hiroshi Atobe et al.

It is certified that error appears in the above-identified patent and that said Letters Patent is hereby corrected as shown below:

Column 10,
Line 27, "data;" should read -- data; and --; and
Line 30, "language; and" should read -- language, --.

Column 11,
Line 15, "language;" should read -- language, --.

Column 12,
Line 21, "language;" should read -- language, --.

Signed and Sealed this

Ninth Day of July, 2002

Attest:

JAMES E. ROGAN
Attesting Officer        Director of the United States Patent and Trademark Office

UNITED STATES PATENT AND TRADEMARK OFFICE
CERTIFICATE OF CORRECTION

PATENT NO.   : 6,281,979 B1
DATED         : August 28, 2001
INVENTOR(S)  : Hiroshi Atobe et al.

It is certified that error appears in the above-identified patent and that said Letters Patent is hereby corrected as shown below:

<u>Title page,</u>
Insert -- Item [56], References Cited,
| | | | |
|---|---|---|---|
| 4,847,641* | 7/1989  | Tung              | 347/131 |
| 5,005,139* | 4/1991  | Tung              | 358/1.1 |
| 5,477,246* | 12/1995 | Hirabayashi et al.| 347/12  |
| 5,367,617* | 11/1994 | Goossen et al.    | 345/442 |
| 5,381,521* | 1/1995  | Ballard           | 345/442 |
| 5,475,807* | 12/1995 | Yoshida et al.    | 345/170 -- |

Signed and Sealed this

Thirteenth Day of August, 2002

*Attest:*

JAMES E. ROGAN
*Attesting Officer*   *Director of the United States Patent and Trademark Office*